United States Patent
Yeh et al.

(10) Patent No.: US 10,875,802 B2
(45) Date of Patent: Dec. 29, 2020

(54) PORTABLE WASTEWATER TREATMENT SYSTEMS

(71) Applicant: UNIVERSITY OF SOUTH FLORIDA, Tampa, FL (US)

(72) Inventors: Daniel H. Yeh, Tampa, FL (US);
Robert A. Bair, Tampa, FL (US);
Onur Y. Ozcan, Tampa, FL (US);
George H. Dick, Tampa, FL (US);
Jorge Luis Calabria, Tampa, FL (US);
Matthew Jeffrey Woodham, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 0 days.

(21) Appl. No.: 15/126,405

(22) PCT Filed: Mar. 19, 2015

(86) PCT No.: PCT/US2015/021473
§ 371 (c)(1),
(2) Date: Sep. 15, 2016

(87) PCT Pub. No.: WO2015/143160
PCT Pub. Date: Sep. 24, 2015

(65) Prior Publication Data
US 2017/0081225 A1    Mar. 23, 2017

Related U.S. Application Data (60) Provisional application No. 61/955,450, filed on Mar. 19, 2014.

(51) Int. Cl.
*C02F 3/28* (2006.01)
*B65D 21/02* (2006.01)
(Continued)

(52) U.S. Cl.
CPC ............. *C02F 3/2853* (2013.01); *A01G 9/14* (2013.01); *A01G 33/00* (2013.01);
(Continued)

(58) Field of Classification Search
CPC ........ C02F 3/2853; C02F 3/284; C02F 3/302; C02F 3/30; C02F 3/28; C02F 3/2826;
(Continued)

(56) References Cited

U.S. PATENT DOCUMENTS 6,007,712 A * 12/1999 Tanaka ................ C02F 3/085
210/151
6,393,775 B1 * 5/2002 Staschik ................ C02F 9/00
210/170.08
(Continued)

FOREIGN PATENT DOCUMENTS

CN         101665306 A       3/2010

OTHER PUBLICATIONS

EP foreign search report Application No. 15765405.4 dated Oct. 6, 2017.
(Continued)

*Primary Examiner* — Nam X Nguyen
*Assistant Examiner* — Julia L. Wun
(74) *Attorney, Agent, or Firm* — Thomas Horstemeyer, LLP (57) ABSTRACT

In one embodiment, a portable wastewater treatment system includes an anaerobic reactor in which organic material within the wastewater can be broken down, a membrane filter that receives wastewater from the anaerobic reactor and filters the water to produce permeate, and a small shipping container in which the reactor and the membrane filter are contained.

23 Claims, 10 Drawing Sheets

(51) Int. Cl.
| | |
|---|---|
| *C02F 103/00* | (2006.01) |
| *A47K 11/02* | (2006.01) |
| *A01G 9/14* | (2006.01) |
| *A01G 33/00* | (2006.01) |
| *C02F 3/30* | (2006.01) |
| *E04H 1/12* | (2006.01) |

(52) U.S. Cl.
CPC .......... *B65D 21/0209* (2013.01); *C02F 3/284* (2013.01); *A47K 11/02* (2013.01); *C02F 3/302* (2013.01); *C02F 2103/005* (2013.01); *C02F 2201/009* (2013.01); *C02F 2203/002* (2013.01); *C02F 2203/008* (2013.01); *C02F 2303/04* (2013.01); *C02F 2303/10* (2013.01); *E04H 1/1216* (2013.01); *Y02A 20/212* (2018.01); *Y02A 40/25* (2018.01); *Y02A 50/30* (2018.01); *Y02E 50/30* (2013.01); *Y02W 10/30* (2015.05); *Y02W 10/37* (2015.05)

(58) Field of Classification Search
CPC .......... C02F 2201/009; C02F 2201/008; C02F 2203/008; C02F 2203/002; C02F 2103/005; C02F 2303/10; C02F 2303/04; B65D 21/0209; B65D 21/0235; B65D 21/00; A01G 33/00; A01G 9/14; A47K 11/02; Y02A 50/454; Y02A 20/212; Y02A 40/252; Y02W 10/37; Y02W 10/30; Y02E 50/343; E04H 1/1216
USPC .................... 210/603, 630, 615, 321.66, 244
See application file for complete search history.

(56) References Cited

U.S. PATENT DOCUMENTS

| | | | |
|---|---|---|---|
| 6,409,914 B1* | 6/2002 | Keppeler | C02F 3/1242 |
| | | | 210/151 |
| 2002/0189173 A1 | 12/2002 | Staschik | |
| 2004/0118780 A1* | 6/2004 | Willman | B01D 61/025 |
| | | | 210/652 |
| 2008/0100037 A1* | 5/2008 | Greene, III | B62D 63/061 |
| | | | 280/656 |
| 2010/0159554 A1 | 6/2010 | O'Rear | |
| 2010/0264079 A1* | 10/2010 | Begin | C05F 17/0018 |
| | | | 210/603 |
| 2011/0163022 A1 | 7/2011 | Kolesnikov | |
| 2011/0186513 A1 | 8/2011 | Vuong et al. | |
| 2012/0255902 A1* | 10/2012 | Livingston | B01D 61/145 |
| | | | 210/607 |
| 2013/0092770 A1 | 4/2013 | Gitschel | |
| 2013/0130346 A1* | 5/2013 | Hansen | B09B 3/00 |
| | | | 435/167 |
| 2014/0144820 A1 | 5/2014 | Early | |
| 2014/0299541 A1 | 10/2014 | Armour | |

OTHER PUBLICATIONS

Gao, et al. "Integrated Anaerobic Fluidized-Bed Membrane Bioreactor for Domestic Wastewater Treatment", Chemical Engineering Journal 240, 2014.

Prieto, et al., "Development and Start Up of a Gas-Lift Anaerobic Membrane Bioreactor (Gi-AnMBR) for conversion of Sewage to Energy, Water, and Nutrients", Journal of Membrane Science 441, 2013.

EP foreign search report Application No. 15765405.4 dated Jul. 23, 2018.

Pillay, et al., "An anaerobic baffled reactor/membrane bioreactor (ABR/MBR) for on-site sanitation in low income areas", Desalination, Elsevier, Amsterdam, NL, bol. 231, No. 1-3, Oct. 31, 2008.

* cited by examiner

PORTABLE WASTEWATER TREATMENT SYSTEMS

CROSS-REFERENCE TO RELATED APPLICATION

This application is the 35 U.S.C. § 371 national stage of, and claims priority to and the benefit of, PCT application PCT/US2015/021473, filed Mar. 19, 2015, which claims priority to and the benefit of U.S. Provisional Application No. 61/955,450, filed on Mar. 19, 2014, herein incorporated by reference in their entirety.

BACKGROUND

In developed countries, wastewater from toilets is typically carried by underground sewers to large wastewater treatment plants at which the wastewater is treated and often returned to the environment. In many places in the world, however, such sewer systems do not exist. In such places, portable wastewater treatment systems are needed to treat the wastewater that is produced. Although some portable wastewater treatment systems have been developed that can be deployed in such places, most are quite large and therefore require a large amount of ground space. Such systems, therefore, cannot be used in places in which such space is not available. Furthermore, existing portable wastewater treatment systems typically produce large amounts of byproducts that must be removed. Moreover, existing portable wastewater treatment systems typically require an external power source to drive them even though such power is often not available in underdeveloped areas.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, portable wastewater treatment systems are needed in places in which sewers systems do not exist. Although various portable wastewater treatment systems have been developed, they comprise drawbacks that make their use undesirable. Disclosed herein are portable wastewater treatment systems that avoid such drawbacks. In some embodiments, the disclosed portable wastewater treatment systems are contained within small shipping containers that have a small horizontal footprint and, therefore, can be used in locations in which space is in short supply. In some embodiments, the small shipping containers are a fraction of the length of a conventional full-sized intermodal shipping container. In some embodiments, the wastewater treatment systems comprise an anaerobic reactor used in conjunction with a membrane filter. This enables the system to be contained within such a small space. In some embodiments, the portable wastewater treatment systems are further self-sustaining and require no external electrical power.

In the following disclosure, various specific embodiments are described. It is to be understood that those embodiments are example implementations of the disclosed inventions and that alternative embodiments are possible. All such embodiments are intended to fall within the scope of this disclosure.

As identified above, disclosed herein are portable wastewater treatment systems that can be deployed and used in underdeveloped areas in which there are no sewer systems or where sewers exist, but water recycling is desirable. The systems are designed as a "wastewater treatment system in a box" in which all or most of the components of the system are contained within a small shipping container that can be both easily shipped and installed in an area in which not much space is available. As used herein, the term "small shipping container" is used to identify shipping containers that are less than 7 feet in length and therefore are significantly shorter than (but have other dimensions that are similar to) conventional 20 foot long intermodal shipping containers. In some embodiments, the small shipping containers have a length that is a whole factor of the length of a 20 foot long intermodal shipping container.

In some embodiments, the shipping containers comprise "quadcons," which are standardized miniature shipping containers that are approximately 5 feet in length and have a horizontal footprint of approximately 40 square feet. When four such quadcons are secured together end-to-end, a package having substantially the same footprint as a standard 20 foot intermodal shipping container results. Examples of quadcons are illustrated in FIGS. 8-14. In other embodiments, the small shipping containers comprise "tricons," which are between approximately 6 and 7 feet in length and have a horizontal footprint of approximately 52 square feet. When three tricons are connected together end-to-end, a package having substantially the same footprint as a standard 20 foot intermodal shipping container results. Although such packages can be shipped as independent units, in some cases the packages are designed to fit within a standard intermodal shipping container, which can provide protection to the small shipping containers.

The components of the portable wastewater treatment systems can be fit within such small containers in part because the systems use an anaerobic reactor in conjunction with a membrane filter (commonly referred to as an anaerobic membrane bioreactor). This is in contrast to existing portable wastewater treatment systems that are designed like miniature versions of large-scale wastewater treatment plants and treat wastewater aerobically. Such aerobic systems typically generate a large amount of byproducts (e.g., sludge) that must be periodically removed. Furthermore, aerobic treatment typically requires external electric power to provide for sufficient aeration of the wastewater and aerobic microbes.

As described below, the disclosed portable wastewater treatment systems are, in some embodiments, designed to be used "off the grid" in locations in which no consistent source of electric power exists to operate the system. In such cases, the systems are not only self-contained but are further self-sustaining. In some embodiments, biogas produced in the treatment process is recovered and used to heat the wastewater prior to treatment and/or to generate electricity used to actuate pumps of the system. In other embodiments, a source of renewable energy, such as solar or wind power, is integrated into the wastewater treatment system to provide heat and/or electricity to the system. In still other embodiments, both biogas and renewable energy are utilized to account for times in which either is in short supply.

As is further described below, in some embodiments, the treated water that exits the disclosed portable wastewater treatment systems can be put to some beneficial use to provide for resource recovery.

Figure 1:
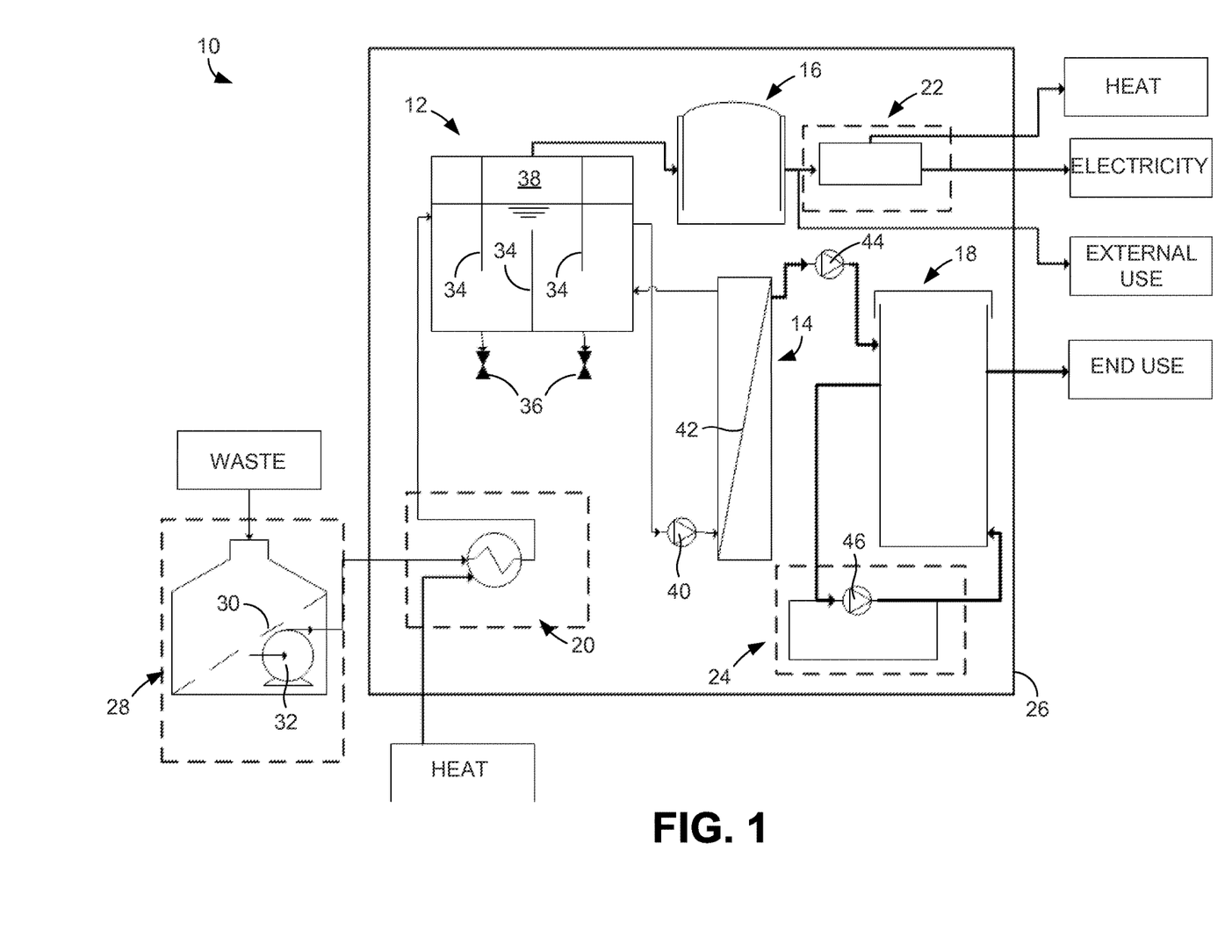
FIG. 1 is a block diagram of a first embodiment of a portable wastewater treatment system.

FIG. 1 illustrates an embodiment of a portable wastewater treatment system 10. The system 10 is designed as an anaerobic membrane bioreactor (AnMBR) and generally comprises an anaerobic reactor 12, a membrane module 14, a biogas storage tank 16, a permeate storage tank 18, and various optional components, including a heat exchanger 20, a biogas system 22, and a disinfection system 24. As illustrated in FIG. 1, each of these components is contained within a small shipping container 26, which can comprise a quadcon or a tricon. As these particular components are used to treat wastewater, these components by themselves by are considered to form a portable wastewater treatment system.

With continued reference to FIG. 1, organic waste, which can comprise human waste and/or food waste, can be input into an optional equalization tank 28, which can be buried underground near the small shipping container 26. As shown in the figure, the equalization tank 28 can include a fine screen 30 that is used to separate trash from the remainder of the contents in the tank and prevent large, abrasive objects from entering the reactor 12. The equalization tank 28 further includes a feed pump 32 that is used to drive wastewater to the remainder of the portable wastewater treatment system 10 for processing. As indicated above, the equalization tank 28 is optional and therefore is not required. It is useful, however, because it is possible that the supply of waste to the system 10 may not be steady. For example, waste may be fed to the system 10 more frequently during the day than during the night. By collecting and storing the waste in the equalization tank 28, the flow of waste to the system 10 can be buffered and wastewater can be provided to the system as needed and not only when available.

After exiting the equalization tank 28 (when provided), wastewater enters the interior of the small shipping container 26 and passes through the optional heat exchanger 20. When provided, the heat exchanger 20 heats the wastewater before it is provided to the anaerobic reactor 12. Heating the wastewater in this manner reduces pathogen loading, increases hydrolysis of complex organic matter contained in the wastewater, and generally increases the treatment efficiency of the portable wastewater treatment system 10. The heat for the heat exchanger 20 can be derived from various sources comprised by or associated with the system 10. For example, biogas collected from the system 10 can be used as a fuel source to provide combustion that heats the heat exchanger 20. Alternatively or in addition, a renewable energy source can be used to generate this heat. For example, photovoltaic panels can be mounted to the small shipping container 26 (see FIG. 8) that be used to generate electricity that can be used to power a heating coil of the heat exchanger 20. As another example, solar thermal collectors can be mounted to the small shipping container 26 (see FIG. 13) that can be used to generate heat for the heat exchanger 20.

Irrespective of whether or not the wastewater is heated, it is delivered to the anaerobic reactor 12, which breaks down the organic material within the wastewater using microbes. In the illustrated example of FIG. 1, the reactor 12 comprises a baffled reactor that includes multiple baffles 34 that form different zones within the reactor. Solid material that sinks within the reactor 12 can be removed through sludge valves 36 provided at the bottom of the reactor. As the organic material in the wastewater is broken down, biogas is generated that fills a head space 38 of the reactor 12. This biogas can be removed from the reactor 12 and delivered to and stored in the biogas storage tank 16.

As noted above, the biogas collected from the reaction in the anaerobic reactor 12 can be used, in some embodiments, to provide heat for the heat exchanger 20. In such a case, the biogas system 22 can comprise a heating unit in which the biogas is combusted to generate this heat. In other embodiments, the biogas system 22 can comprise an electric generator in which the biogas is used to generate electricity that can be used to power an electric heater of the heat exchanger 20 or power the various pumps of the portable wastewater treatment system 10. In still other embodiments, the biogas system 22 can comprise a combined heat and power (CHP) system with which electricity can be used to drive the pumps while the waste heat can be used for wastewater heating. In each of these examples, the energy of the biogas is used internally within the system 10 to enable the system to be self-sustaining. In other embodiments, the biogas can be used outside the system 10 for some beneficial external use.

The wastewater within the reactor 12 flows through each zone of the reactor under the pumping action of at least one membrane feed pump 40 that is provided between the reactor and the membrane module 14. The pump 40 delivers the wastewater to the membrane module 14 and the module filters the wastewater using a membrane 42, which can comprise one or more micro or ultrafiltration membranes. The concentrated contents of the wastewater are returned to the reactor 12 as concentrate, while the permeate that is pulled through the membrane 42 with a permeate pump 44 is delivered to the permeate storage tank 18.

In some cases, it may be desirable to disinfect or otherwise "polish" the permeate. In such case, the optional disinfection system 24 can be used for this purpose. The disinfection system 24 can be configured to use any one or more of a number of disinfection processes, such as electrochlorination, chlorination, ultraviolet exposure, catalysis, and other advanced oxidation processes. As shown in FIG. 1, the disinfection system 24, when present, can comprise a pump 46 that is used to draw permeate from and return permeate to the permeate storage tank 18. Irrespective of whether or not such disinfection is performed, the permeate can be removed from the permeate storage tank 18 and from the small shipping container 26, and can be put to some beneficial use to provide for resource recovery. Several examples of such uses are described below in relation to FIGS. 8-12.

Figure 2:
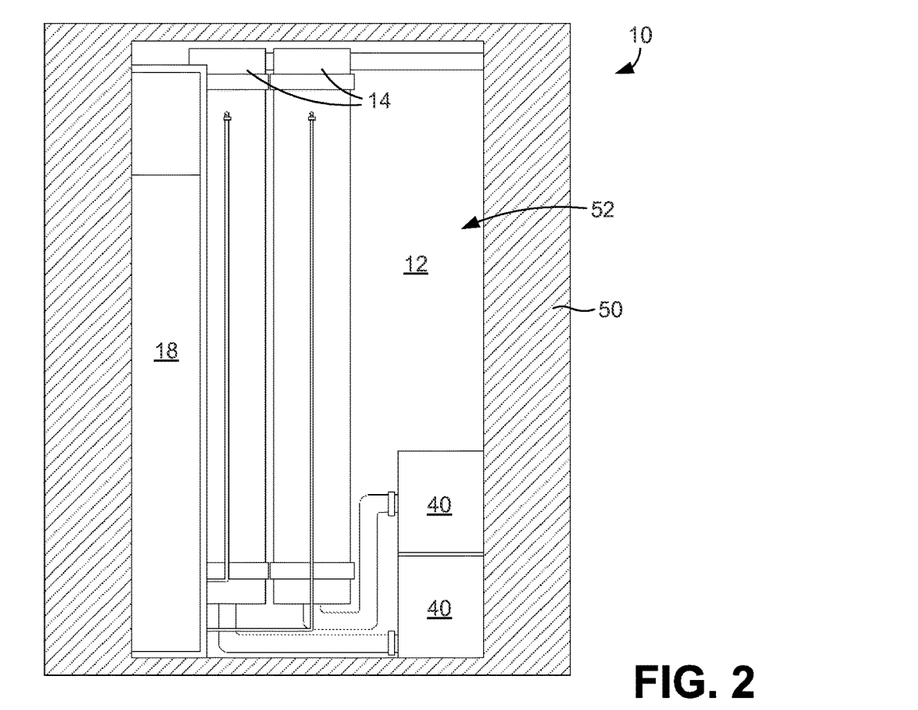
FIG. 2 is a front view of a small shipping container that houses components of the system of FIG. 1.
Figure 3:
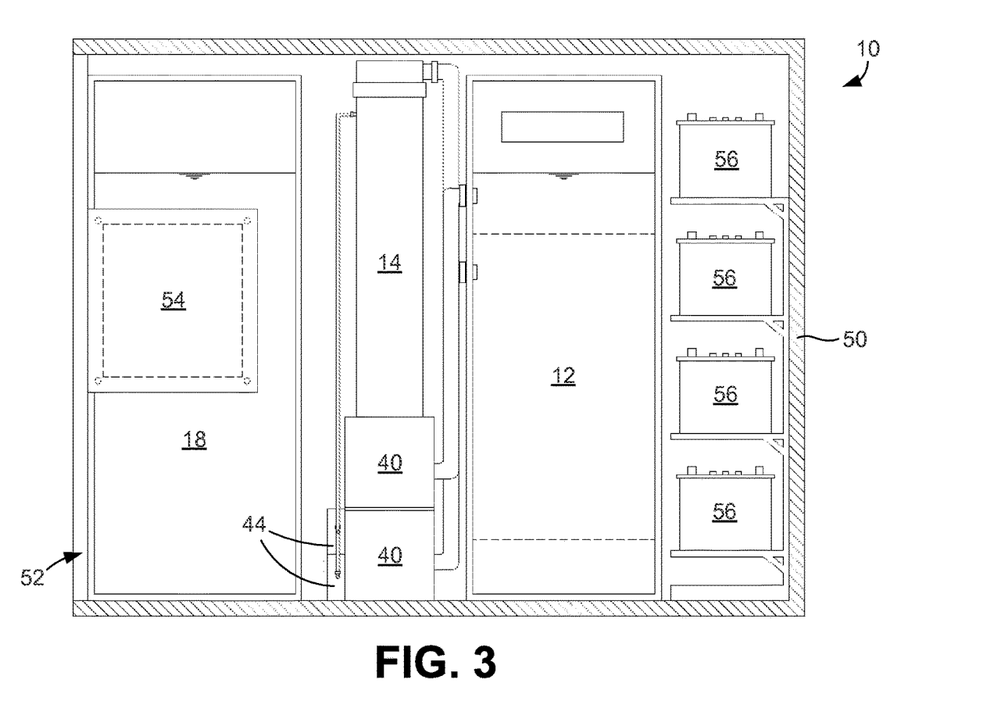
FIG. 3 is a side view of a small shipping container that houses components of the system of FIG. 1.
Figure 4:
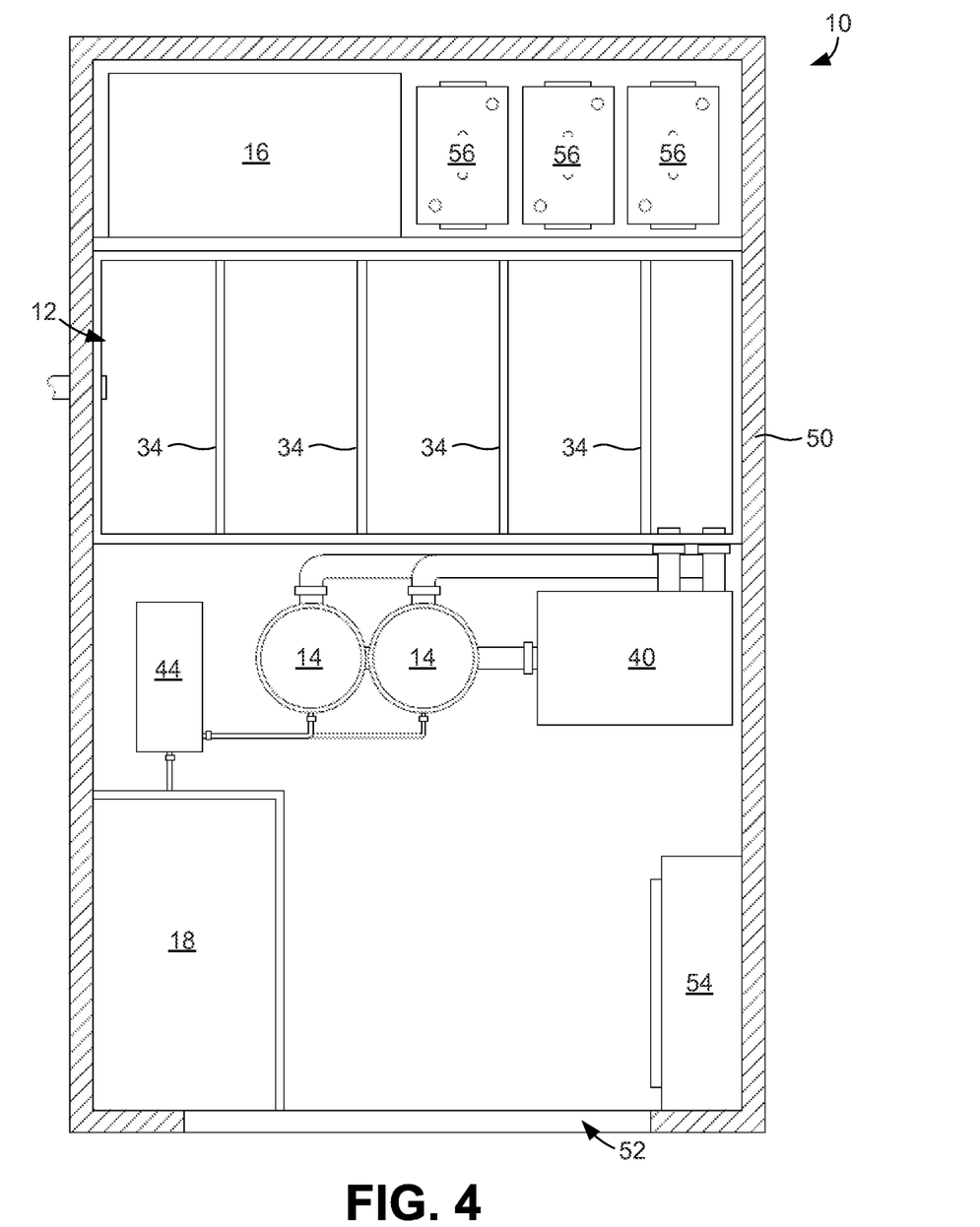
FIG. 4 is a top view of a small shipping container that houses components of the system of FIG. 1.

FIGS. 2-4 illustrate an example of how the various components of the portable wastewater treatment system 10 can be packaged within a quadcon container 50. Such a container is approximately 5 feet long, 8 feet wide, and 7 feet tall (tricons have similar width and height dimensions). FIG. 2 shows the container 50 in front view. As indicated in FIG. 2, various components of the system 10 are visible through an entrance 52 of the container 50, through which a human user can pass. In this view, the anaerobic bioreactor 12, the membrane module 14, the permeate storage tank 18, and the membrane feed pumps 40 are visible. Referring next to FIG. 3, which shows the container 50 in side view, visible are the anaerobic bioreactor 12, the membrane module 14, the permeate storage tank 18, membrane feed pumps 40, and the permeate pump 44. Also visible in FIG. 3 are a control panel 54 that can be used to control operation of the system 10 and multiple batteries 56 that can be used to store energy created by a generator of the system or photovoltaic cells of the system. Finally, referring to FIG. 4, shown is a top view of the container 50. In this view, the anaerobic bioreactor 12 (and its baffles 34), the membrane module 14, the biogas storage tank 16, the permeate storage tank 18, a membrane feed pump 40, the permeate pump 44, the control panel 54, and the batteries 56 are visible. As can be appreciated from these three figures, each of the components of the system 10 can fit within the interior space of the container 50 with enough room left over for a human being to enter the container to operate the system and conduct maintenance or repairs. As is apparent most clearly from FIG. 4, there is enough free space within the container 50 to store additional components that are to be used with the system, such as photovoltaic panels. Accordingly, such additional components can be shipped within the container 50, if desired.

Figure 5:
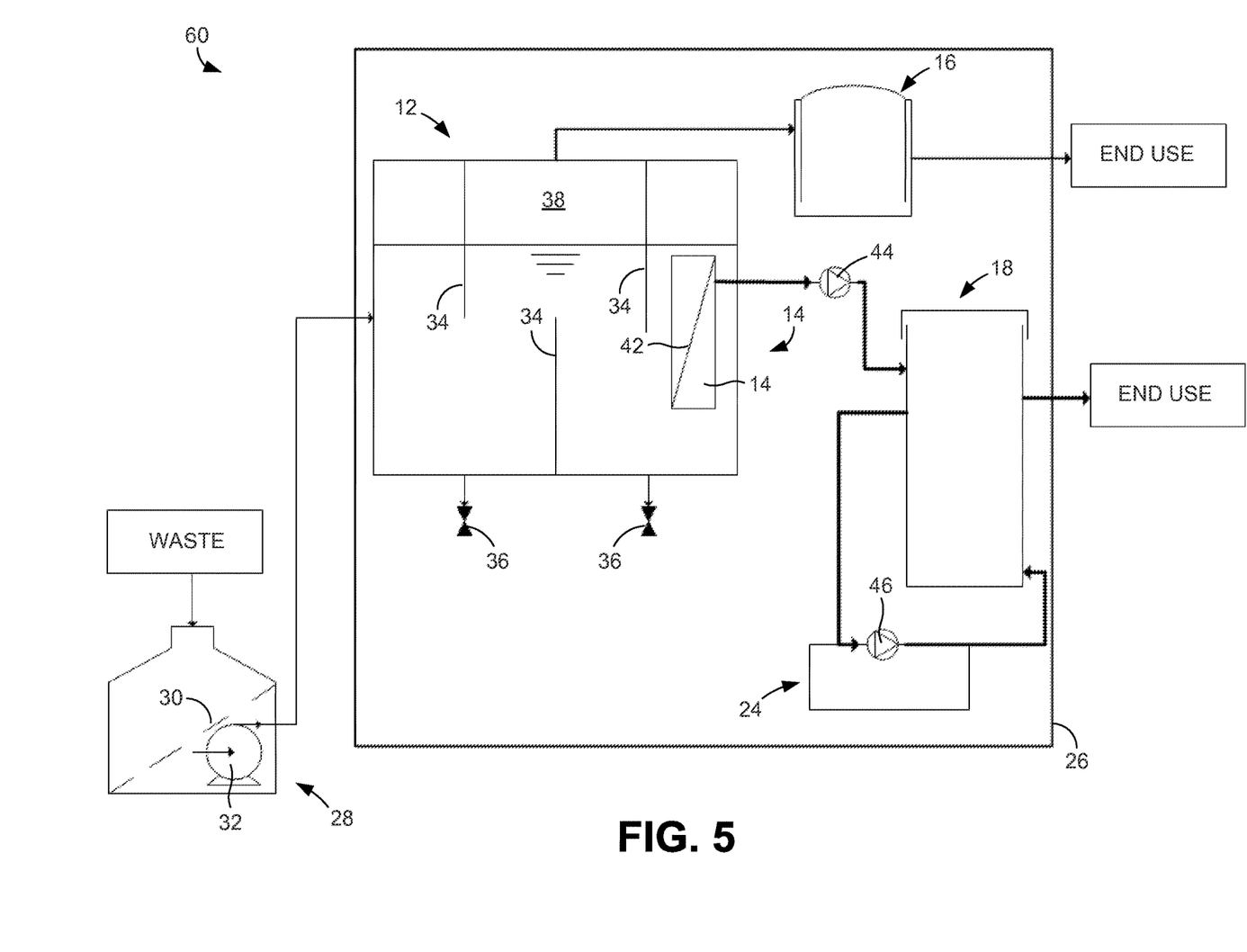
FIG. 5 is a block diagram of a second embodiment of a portable wastewater treatment system.

FIG. 5 illustrates a further embodiment of a portable wastewater treatment system 60. The system 60 includes many of the components of the system 10 shown in FIG. 1 and, therefore, generally comprises an anaerobic reactor 12, a membrane module 14, a biogas storage tank 16, a permeate storage tank 18, and a disinfection system 24. Each of these components is contained within a small shipping container 26, which can comprise a quadcon or a tricon. In addition, the system 60 includes an external equalization tank 28. Unlike the system 10 of FIG. 1, however, the membrane module 14 is incorporated into the reactor 12. In particular, the module 14 is submerged within the wastewater contained in the reactor 12. An advantage of this configuration is that submerged membranes do not require a membrane feed pump. This reduces the energy consumption of the system 60.

Figure 6:
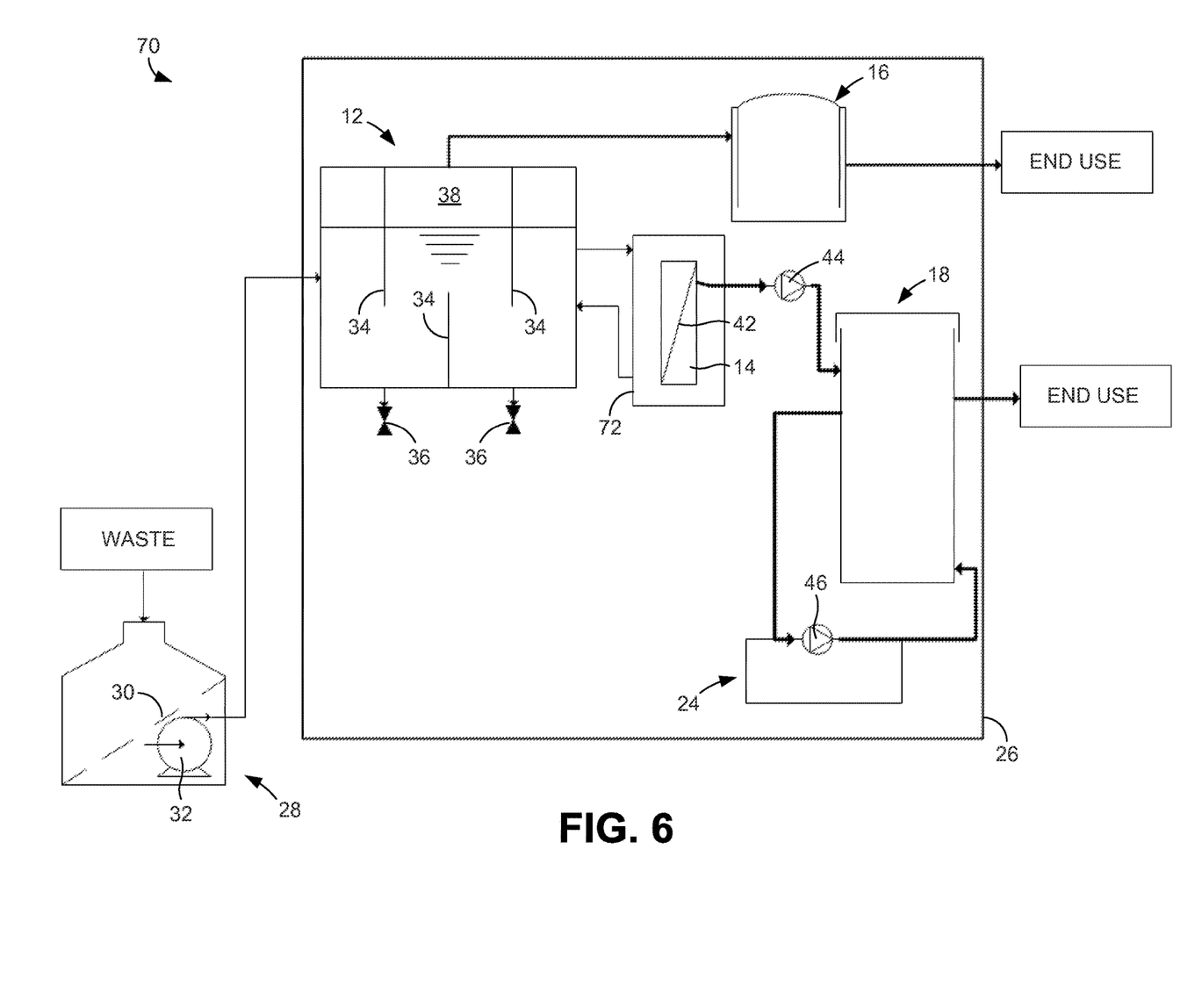
FIG. 6 is a block diagram of a third embodiment of a portable wastewater treatment system.

FIG. 6 illustrates another embodiment of a portable wastewater treatment system 70. The system 60 also includes many of the components of the system 10 shown in FIG. 1 and, therefore, generally comprises an anaerobic reactor 12, a membrane module 14, a biogas storage tank 16, a permeate storage tank 18, and a disinfection system 24. Each of these components is contained within a small shipping container 26, which can comprise a quadcon or a tricon. In addition, the system 60 includes an external equalization tank 28. Unlike the system 10 of FIG. 1, however, the membrane module 14 is submerged in wastewater contained in a membrane tank 72 that is separate from the reactor 12. This configuration has the benefits of a submerged membrane configuration but makes maintenance easier. The membrane tank 72 can be closed off from the reactor 12 in the event that maintenance is required on the membrane module 14.

Figure 7:
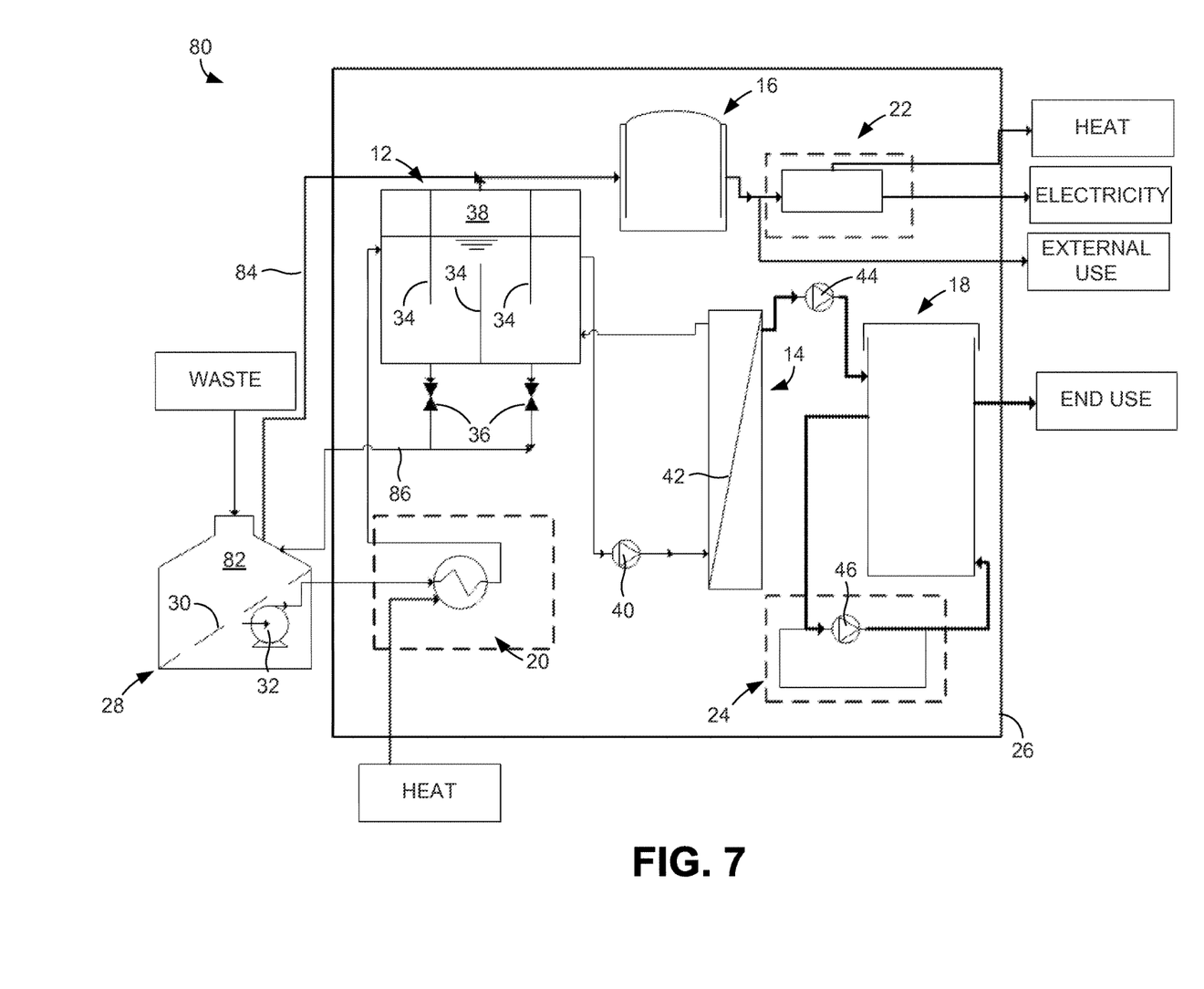
FIG. 7 is a block diagram of a fourth embodiment of a portable wastewater treatment system.

FIG. 7 illustrates yet another embodiment of a portable wastewater treatment system 80. The system 80 again includes many of the components of the system 10 shown in FIG. 1. More particularly, the system 80 generally comprises an anaerobic reactor 12, a membrane module 14, a biogas storage tank 16, a permeate storage tank 18, and various optional components, including a heat exchanger 20, a biogas system 22, and a disinfection system 24. Each of these components is contained within a small shipping container 26, which can comprise a quadcon or a tricon. The system 80 further comprises an external equalization tank 28.

In the embodiment of FIG. 7, however, the external equalization tank 28 is integrated into the system 80 by combining the head space 82 of the equalization tank with the head space 38 of the anaerobic reactor 12. This is achieved with a gas line 84 that extends from the equalization tank 28 to the biogas storage tank 16 and connects to the reactor 12. Anaerobic sludge from the reactor 12 is also sent back to the equalization tank 28 via a sludge line 86 for a second pass through the system 80 prior to final disposal. The second pass subjects the sludge to thermal treatment in the heat exchanger 20, which hydrolyzes or solubilizes the microbial biomass. This practice also encourages microbes from the reactor 12 to colonize the equalization tank 28, rendering it an extension of the reactor. Any biogas from the equalization tank 28 can be collected by the system 80 when the head space 82 is connected to the biogas storage tank 16.

In a variation on the above-described embodiment, the equalization tank 28 can be integrated into the portable wastewater treatment system 80 without the head space connection. In such a case, the system 80 would not include the gas line 84, but would still include the sludge line 86 so that the equalization tank 28 would receive the anaerobic sludge from the reactor 12. In such a configuration, the equalization tank 28 would be open to the atmosphere, or intentionally aerated, so that the conditions within the tank are aerobic. Aerobic conditions and the recycling of the waste would encourage nitrification of nitrogen species within the wastewater. The aerobic conditions would also encourage precipitation of ammonium nitrate, which is another form of nutrient removal.

In a further variation on the above-described embodiment, the conditions in the equalization tank 28 can be controlled to be anoxic. This can be achieved by controlling how much oxygen can enter the tank 28. Organic matter in the tank facilitates the removal of nitrate in the wastewater via denitrification of nitrate to $N_2$ gas. In yet another variation, the tank can be divided into two zones including an upstream aerobic zone and a downstream anoxic zone. Again, this can be achieved by controlling the amount of oxygen that can enter the tank 28. In the aerobic zone, ammonia is nitrified to nitrate. In the anoxic zone, nitrate is denitrified to $N_2$ gas. The wastewater from the anoxic zone can then be fed into the anaerobic reactor 12.

As noted above, the disclosed portable wastewater treatment systems can include renewable energy systems that enable the wastewater treatment systems to be self-sustaining. Such renewable energy systems can be used to generate heat and/or electricity that can be used by the wastewater treatment systems. In addition or exception, the wastewater treatment systems can include components that put the output permeate to a beneficial end use to provide for resource recovery. FIGS. 8-13 illustrate examples of systems that incorporate other systems or components for these purposes.

Figure 8:
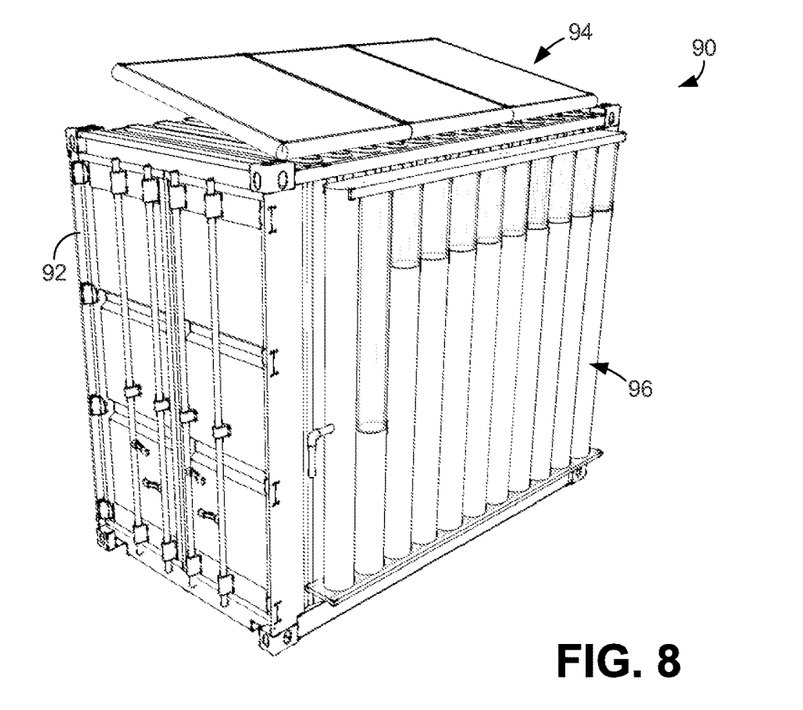
FIG. 8 is a perspective view of a portable wastewater treatment system contained within a quadcon, the system including photovoltaic panels and algae photobioreactors that are mounted to the quadcon.

With reference to FIG. 8, illustrated is a portable wastewater treatment system 90 that is contained within a quadcon 92. As illustrated in this figure, the system 90 includes external photovoltaic panels 94 that are mounted on top of the quadcon 92 that generate electricity that can be used to power the system's heat exchanger and/or pumps. As noted above, this electricity can be stored within batteries of the system 90 to power the system when the sun is not shining. As was also noted above, in some embodiments, the panels 94 can have been shipped to the installation site within the quadcon 92. In addition to the photovoltaic panels 94, the system 90 includes multiple algae photobioreactors 96 that are mounted to the side of the quadcon 92. The photobioreactors receive the permeate from the system 90 and use it to grow algae that can be harvested to create biofuels, animal feed, or to feed the system's reactor to enhance biogas production.

Figure 9:
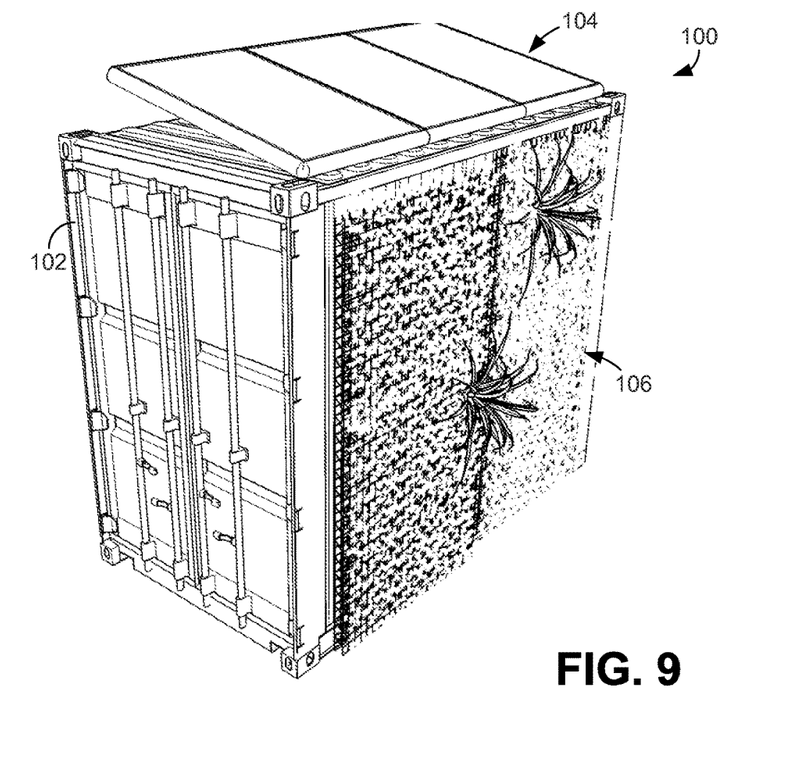
FIG. 9 is a perspective view of a portable wastewater treatment system contained within a quadcon, the system including a green wall that is mounted to the quadcon.

FIG. 9 shows a further portable wastewater treatment system 100 that is contained within a quadcon 102. The system 100 also includes external photovoltaic panels 104 that are mounted on top of the quadcon 102. In addition, the system 100 includes a green wall 106 that is formed on the side of the quadcon 102. This green wall 106 is irrigated by the permeate generated by the system 100 and uses this permeate to grow vegetation either for aesthetic purposes or for food production. Alternatively, the nutrients within the permeate may be removed through a nutrient recovery process, such as via zeolite sorption-precipitation, for off-site agricultural use.

Figure 10:
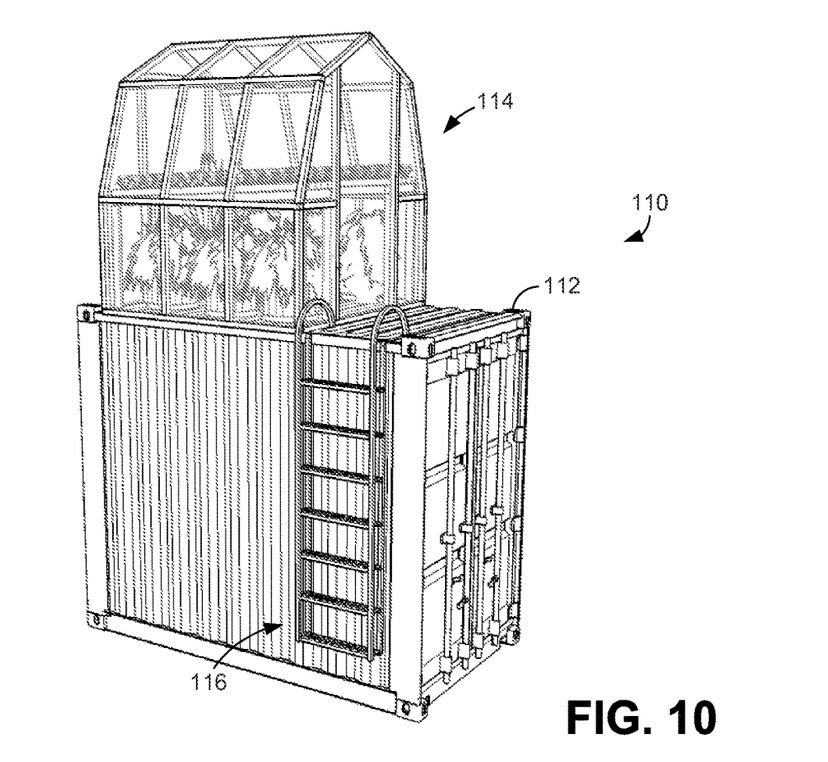
FIG. 10 is a perspective view of a portable wastewater treatment system contained within a quadcon, the system including a greenhouse that is mounted to the quadcon.

FIG. 10 illustrates another portable wastewater treatment system 110 that is contained within a quadcon 112. The system 110 includes an external greenhouse 114 that is mounted on top of the quadcon 112. Like the green wall 106 of the embodiment in FIG. 10, the greenhouse 114 is irrigated by the permeate generated by the system 110. By placing the greenhouse 114 on top of the quadcon 112, the footprint of the system 110 is minimized. The greenhouse 114 can be accessed using a ladder 116 attached to the quadcon 112.

Figure 11:
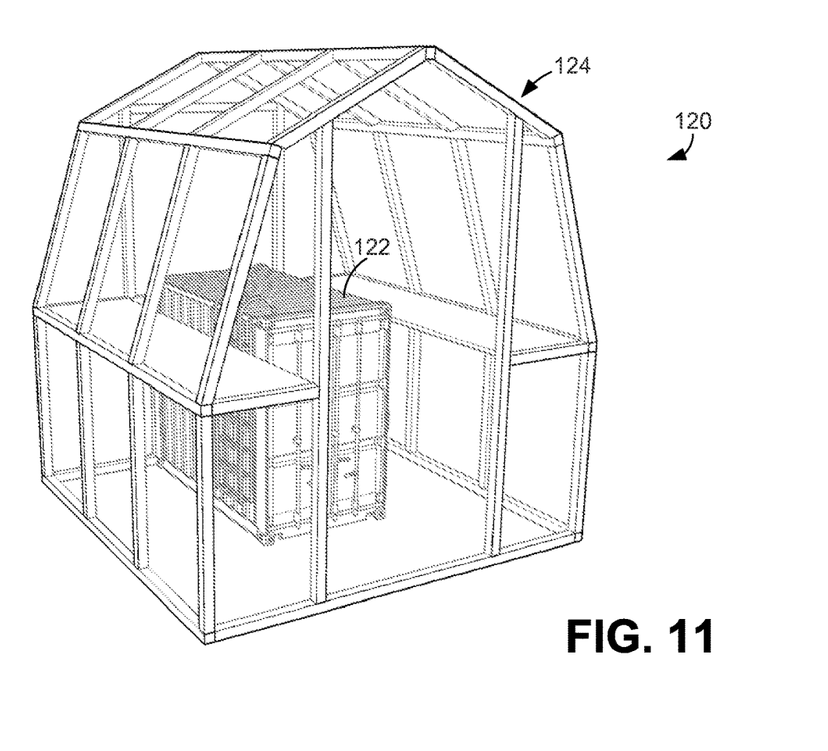
FIG. 11 is a perspective view of a portable wastewater treatment system contained within a quadcon, the system including a greenhouse in which the quadcon is positioned.

FIG. 11 shows another portable wastewater treatment system 120 contained within a quadcon 122 that incorporates an external greenhouse 124. In this embodiment, however, the quadcon 122 is placed inside of the greenhouse 124. When the quadcon 122 is positioned within the greenhouse 124, the temperature within the quadcon is increased, which makes the treatment process more efficient. In addition, the greenhouse 124 can provide protection to the quadcon 122 and the components it contains from the elements, or simply provide a visual screen.

Figure 12:
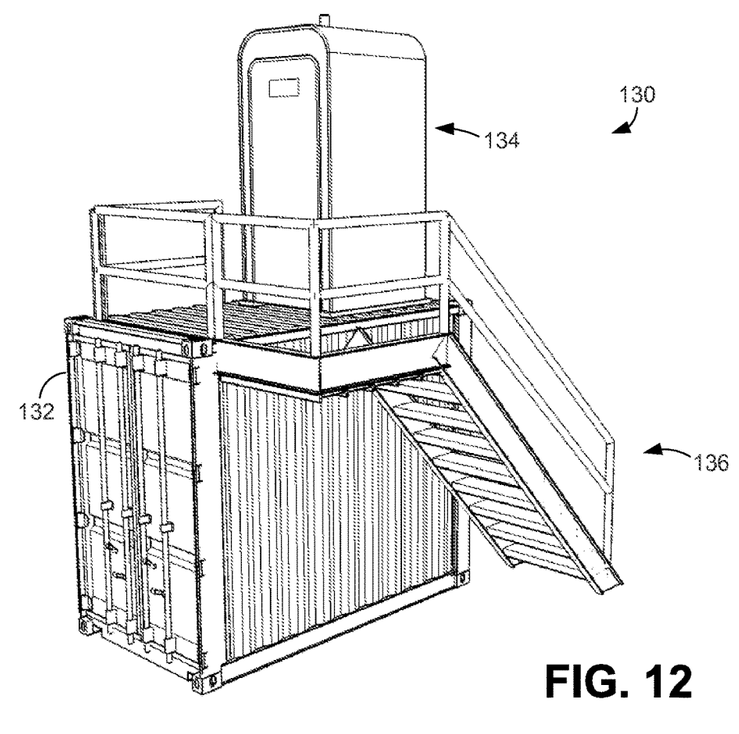
FIG. 12 is a perspective view of a portable wastewater treatment system contained within a quadcon, the system including a toilet that is mounted to the quadcon.

FIG. 12 illustrates another portable wastewater treatment system 130 that is contained within a quadcon 132. In this embodiment, the system 120 includes a portable toilet 134 that is mounted on top of the quadcon 132 and that can be accessed using a staircase 136 that is attached to the quadcon. Notably, the toilet 134 need not be mounted on top of the quadcon 132. However, when a toilet is on top of the quadcon 132, the footprint of the system 130 is minimized and waste can be delivered directly into the system under the force of gravity.

Figure 13:
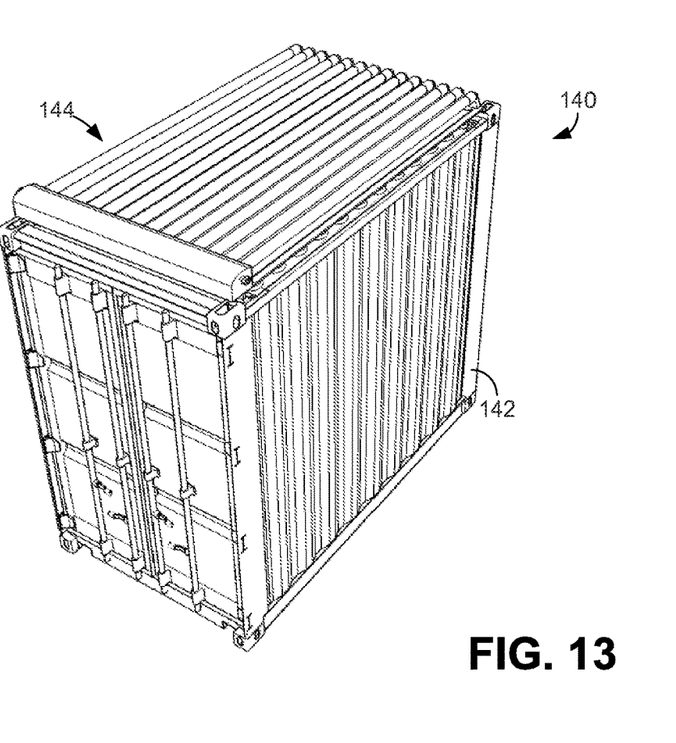
FIG. 13 is a perspective view of a portable wastewater treatment system contained within a quadcon, the system including thermal solar collectors that are mounted to the quadcon.

FIG. 13 shows a portable wastewater treatment system 140 that is contained within a quadcon 142 upon which solar thermal collectors 144 that are mounted. These collectors 144 can be used to provide heat to a heat exchanger of the system 140. In some embodiments, the fluid circulating in the solar thermal collectors 144 can comprise wastewater or permeate from the system 140. In other embodiments, the fluid circulating in the solar thermal collectors 144 can be another fluid with greater heat capacity, such as an oil.

Figure 14:
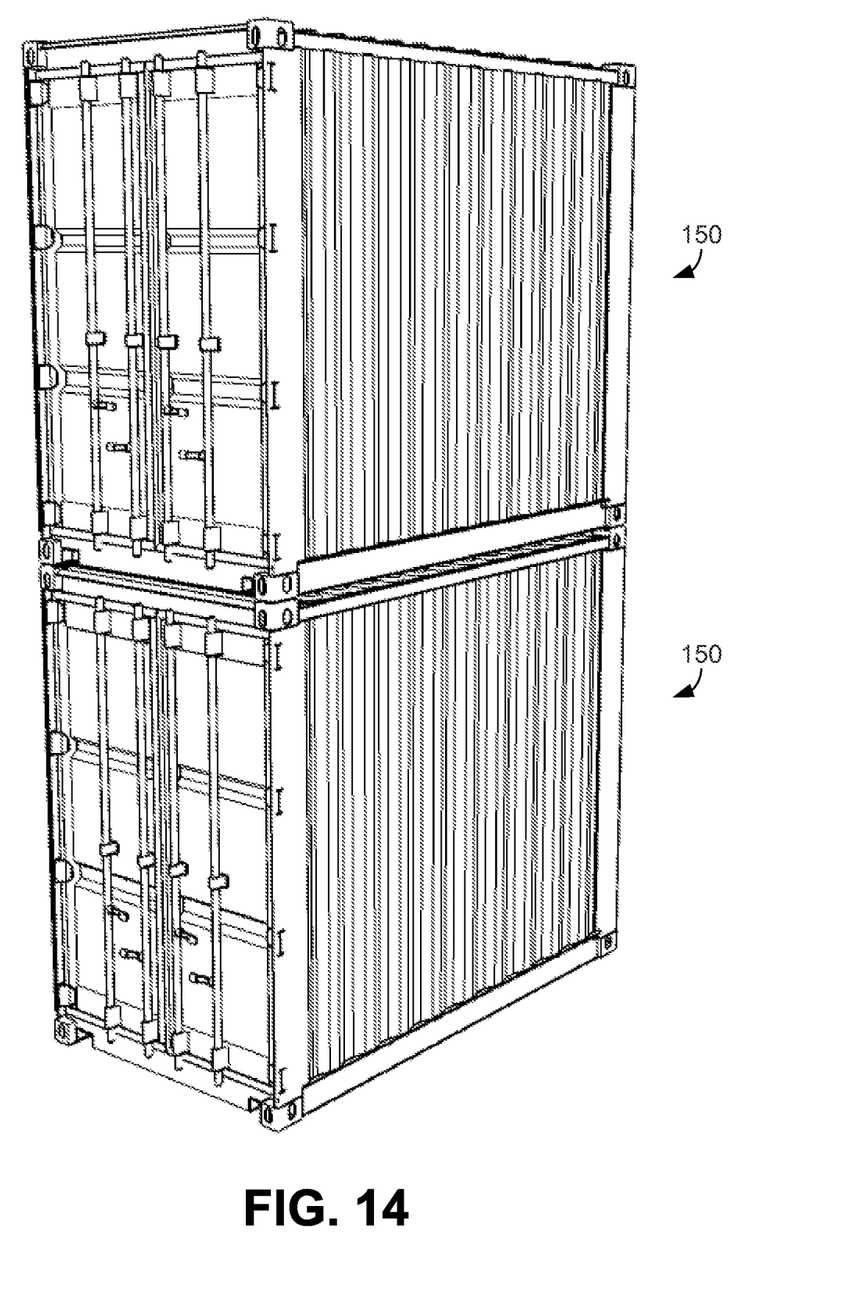
FIG. 14 is a perspective view of a portable wastewater treatment system contained within two quadcons that are stacked on top of each other.

As described above, one important aspect of the portable wastewater treatment systems disclosed herein is that they are contained within small shipping containers and, therefore, have small footprints. In some embodiments, the capacity of the system can be increased by stacking two or more small shipping containers on top of each other. This is illustrated in FIG. 14, which shows two quadcons 150 are stacked on top of each other.

The invention claimed is:

1. A portable, self-contained wastewater treatment apparatus comprising:
   an enclosed tricon or quadcon shipping container that defines an interior space, the shipping container including an entrance through which the interior space of the shipping container can be entered by a human being; and
   a self-sustaining wastewater treatment system wholly contained within the interior space of the shipping container such that no component of the wastewater treatment system is external to the shipping container, the wastewater treatment system comprising:
      an anaerobic membrane bioreactor including an anaerobic reactor in which wastewater can be received and organic material within the wastewater can be broken down, the anaerobic reactor having multiple baffles that form different zones within the reactor through which the wastewater passes, and a membrane module having a microfiltration or ultrafiltration membrane that receives treated wastewater from the anaerobic reactor, filters the treated water to produce permeate, and returns concentrate to the anaerobic reactor for further treatment,
      a biogas storage unit configured to receive and store biogas generated by reactions that occur within the anaerobic reactor,
      a permeate storage unit configured to receive and store the permeate produced by the membrane module,
      at least one pump configured to drive the wastewater, the permeate, or both through the wastewater treatment system,.
      a biogas utilization system that includes an electric generator configured to receive biogas from the anaerobic reactor, the biogas storage unit, or both and use that biogas to generate electricity that powers the wastewater treatment system, wherein the wastewater treatment system is self-sustaining and requires no external electric power to operate because of the operation of the biogas utilization system, and
      at least one battery configured to store surplus electricity generated by the electric generator.

2. The apparatus of claim 1, wherein the microfiltration or ultrafiltration membrane is submerged in the anaerobic reactor.

3. The apparatus of claim 1, wherein the microfiltration or ultrafiltration membrane is submerged in a membrane tank.

4. The apparatus of claim 1, wherein the wastewater treatment system further comprises a heat exchanger configured to heat the wastewater before it enters the anaerobic reactor.

5. The apparatus of claim 4, wherein the heat exchanger is powered by electricity generated by the electric generator of the biogas utilization system.

6. The apparatus of claim 1, wherein the wastewater treatment system further comprises a disinfection system configured to receive permeate from the permeate storage unit, disinfect that permeate, and return disinfected permeate back to the permeate storage unit.

7. The apparatus of claim 6, wherein the disinfection system uses one or more of chlorination, electrochlorination, ultraviolet exposure, and catalysis to disinfect the permeate.

8. The apparatus of claim 1, wherein the pump is powered by electricity generated by the electric generator of the biogas utilization system.

9. The apparatus of claim 1, further comprising an external equalization tank configured to receive waste and provide the wastewater to the anaerobic reactor.

10. The apparatus of claim 9, wherein a head space of the external equalization tank is in fluid communication with a head space of the anaerobic reactor.

11. The apparatus of claim 9, wherein sludge collected in the anaerobic reactor is returned to the external equalization tank.

12. The apparatus of claim 1, further comprising a renewable energy component mounted to the exterior of the shipping container configured to generate energy that can be used by the wastewater treatment system.

13. The apparatus of claim 12, wherein the renewable energy component comprises at least one solar panel mounted to the shipping container configured to generate electricity that can be used to power the wastewater treatment system.

14. The apparatus of claim 12, wherein the renewable energy component comprises at least one solar thermal collector mounted to the shipping container configured to generate heat that can be supplied to the wastewater treatment system.

15. The apparatus of claim 14, wherein the wastewater treatment system further comprises a heat exchanger configured to heat the wastewater before it enters the anaerobic reactor, wherein the heat exchanger receives the heat generated by the at least one solar thermal collector.

16. The apparatus of claim 12, wherein the renewable energy component comprises at least one wind turbine mounted to the shipping container configured to generate electricity that can be used to power the wastewater treatment system.

17. The apparatus of claim 1, further comprising a component mounted to the exterior of the shipping container configured to utilize the permeate stored in the permeate storage unit for a beneficial use.

18. The apparatus of claim 1, further comprising a toilet that provides waste to the wastewater treatment system.

19. The apparatus of claim 18, wherein the toilet is mounted to the top of the shipping container.

20. The apparatus of claim 1, further comprising a nutrient recovery component configured to remove nutrients from the permeate exiting the anaerobic membrane bioreactor.

21. The apparatus of claim 20, wherein the nutrient recovery component uses zeolite to remove the nutrients from the permeate.

22. A method for providing wastewater treatment, the method comprising:
obtaining an enclosed tricon or quadcon shipping container that defines an interior space, the shipping container including an entrance through which the interior space of the shipping container can be entered by a human being;
packaging a self-contained and self-sustaining wastewater treatment system within the shipping container such that no component of the wastewater treatment system is external to the shipping container, the wastewater treatment system comprising:
an anaerobic membrane bioreactor including an anaerobic reactor in which organic material within wastewater can be broken down, the anaerobic reactor having multiple baffles that define different zones within the reactor through which the wastewater passes, and a membrane module having a microfiltration or ultrafiltration membrane that receives treated wastewater from the anaerobic reactor, filters the treated wastewater to produce permeate, and returns concentrate back to the anaerobic reactor for further treatment,
a biogas storage unit configured to receive and store biogas generated by reactions that occur within the anaerobic reactor,
a permeate storage unit configured to receive and store permeate produced by the membrane module,
at least one pump configured to drive wastewater, permeate, or both through the wastewater treatment system;
a biogas utilization system that includes an electric generator configured to receive biogas from the anaerobic reactor, the biogas storage unit, or both and use that biogas to generate electricity that powers the wastewater treatment system, wherein the wastewater treatment system is self-sustaining and requires no external electric power to operate because of the operation of the biogas utilization system, and
at least one battery configured to store surplus electricity generated by the electric generator; and
treating the wastewater using the wastewater treatment system.

23. The method of claim 22, further comprising using the biogas utilization system to generate power for the wastewater treatment system.

* * * * *